United States Patent
Cipriani

(10) Patent No.: US 11,121,616 B2
(45) Date of Patent: Sep. 14, 2021

(54) ROTARY-LINEAR ACTUATION ASSEMBLY

(71) Applicant: AROL S.P.A., Canelli (IT)

(72) Inventor: Marco Cipriani, Alpignano (IT)

(73) Assignee: AROL S.P.A., Canelli (IT)

( * ) Notice: Subject to any disclaimer, the term of this patent is extended or adjusted under 35 U.S.C. 154(b) by 124 days.

(21) Appl. No.: 16/493,067

(22) PCT Filed: Mar. 14, 2018

(86) PCT No.: PCT/IB2018/051698
§ 371 (c)(1),
(2) Date: Sep. 11, 2019

(87) PCT Pub. No.: WO2018/167684
PCT Pub. Date: Sep. 20, 2018

(65) Prior Publication Data
US 2021/0143721 A1    May 13, 2021

(30) Foreign Application Priority Data

Mar. 14, 2017 (IT) .................. 102017000028116

(51) Int. Cl.
*H02K 41/00* (2006.01)
*H02K 1/27* (2006.01)
(Continued)

(52) U.S. Cl.
CPC ......... *H02K 41/031* (2013.01); *H02K 1/2713* (2013.01); *H02K 1/2726* (2013.01); *H02K 16/04* (2013.01); *H02K 2201/18* (2013.01)

(58) Field of Classification Search
CPC .... H02K 41/031; H02K 1/2726; H02K 16/04; H02K 1/2713; H02K 2201/18
See application file for complete search history.

(56) References Cited

U.S. PATENT DOCUMENTS

| 6,362,547 B1 | 3/2002 | Peterson et al. |
| 2011/0193425 A1 | 8/2011 | Hiura et al. |
| 2012/0262259 A1* | 10/2012 | Teo ........................ H02K 16/00 335/296 |

FOREIGN PATENT DOCUMENTS

| DE | 2906404 A1 | 8/1980 |
| DE | 10163626 A1 | 7/2003 |

(Continued)

*Primary Examiner* — Thomas Truong
(74) *Attorney, Agent, or Firm* — Howson & Howson LLP

(57) ABSTRACT

A rotary-linear actuation assembly is provided, in particular of a kind suitable to provide in independent manner at its output, either sequentially or simultaneously, a rotary movement and a linear translation movement. The assembly comprises a casing internally housing an output shaft arranged coaxial with an actuation axis (A) in a translationally and rotationally movable manner; and at least two electromagnetic actuators each comprising a respective electromagnetic stator and a respective magnetic rotor, a first of which being a linear actuator adapted to impart, at its output, a translational movement along the actuation axis (A), and a second of which being a rotary actuator adapted to impart, at its output, a rotary movement around the actuation axis (A). The electromagnetic stators of the electromagnetic actuators are arranged in a mutually coaxial and concentric manner, and each actuator independently acts on the output shaft.

13 Claims, 3 Drawing Sheets

(51) Int. Cl.
*H02K 16/00* (2006.01)
*H02K 41/03* (2006.01)
*H02K 16/04* (2006.01)

(56) References Cited

FOREIGN PATENT DOCUMENTS

DE     102005061028 A1     3/2007
JP         S52-046413 A     4/1977
JP         2003-319635 A    11/2003

\* cited by examiner

ROTARY-LINEAR ACTUATION ASSEMBLY

The present invention concerns a rotary-linear actuation assembly, in particular of a kind suitable to provide in independent manner at its output, either sequentially or simultaneously, a rotary movement and a linear translation movement.

Rotary-linear actuators are currently used in several industrial applications requiring that a same output shaft of the actuator be capable of imparting in independent manner, either simultaneously or sequentially, both a rotary movement and a linear movement.

By way of example, industrial applications employing such actuators are the robotic picking and placing of a component possibly requiring both to be axially displaced in order to reach a given position, and to be subsequently locked in place by screwing.

A rotary-linear actuator suitable for such applications is known for instance from document U.S. Pat. No. 6,362,547. Such an actuator comprises two motors, of which the respective shafts are arranged coaxially and side by side along the output axis of the actuator. A first motor is suitable to provide at its output a translational movement of its shaft, whereas the second motor is suitable to provide at its output a rotational movement of its shaft. The shaft of the rotary motor forms the output shaft of the rotary-linear actuator, and the shaft of the linear motor is connected to the output shaft through the interposition of a rotation-decoupling joint.

The Applicant has realised that such a prior art arrangement is particularly cumbersome, since it comprises two motors arranged axially side-by-side, the axial size of which adds to the sliding stroke travelled by the output shaft.

Moreover, the Applicant has noticed that, for a proper operation of the actuator discussed above, a perfect alignment of the shafts of both motors has to be ensured, with a consequent difficulty in assembling the actuator.

Furthermore, the Applicant has realised that, when the rotary-linear actuator discussed above is made to operate in vertical configuration, where the whole rotary motor is cyclically lifted by the linear motor by acting against the force of gravity, an important energy absorption takes place.

As a further, but not the last problem, the Applicant has noticed that, in case of failure, restoration of a rotary-linear actuator according to the state of the art entails considerable difficulties mainly due to the need to put the moving members in a safety position before carrying out any intervention.

The problem upon which the present invention is based is thus to provide a rotary-linear actuation assembly which is capable of overcoming the limits of the state of the art in simple, reliable and cheap manner.

Within such a problem, it is an object of the present invention to conceive a rotary-linear actuation assembly which has a compact and lightweight structure.

In particular, it is another object of the present invention to provide a rotary-linear actuation assembly which can be easily and quickly assembled and restored in case of failure.

In accordance with a first aspect thereof, the invention therefore concerns a rotary-linear actuation assembly comprising a casing internally housing:
  an output shaft arranged coaxial with an actuation axis in a translationally and rotationally movable manner; and
  at least two electromagnetic actuators each comprising an electromagnetic stator and a magnetic rotor, a first of which is a linear actuator and is adapted to provide, at its output, a translational movement along the actuation axis, and a second of which is a rotary actuator and is adapted to provide, at its output, a rotary movement about the actuation axis,
the assembly being characterised in that the electromagnetic stators are arranged in a mutually coaxial and concentric manner, and each actuator independently acts on the output shaft.

In the present description and in the claims that follow, the term "magnetic rotor" denotes both a rotor of a kind with permanent magnets and a ferromagnetic rotor having a configuration suitable to transfer a rotation torque.

The Applicant has realised that, through the peculiar arrangement of the electromagnetic stators in a mutually concentric and coaxial manner, it is possible to achieve a particularly compact structure having two actuators capable of acting on a same output shaft.

Moreover, the operation of the linear actuator does not result in a displacement of the whole rotary actuator, but only of the rotor associated therewith, thereby drastically reducing the energy absorption in vertical configuration.

The present invention may have at least one of the following preferred features, which in particular can be combined together at will in order to cope with specific application requirements.

Preferably, the first, linear actuator is arranged to impart a translational movement between a first end-of-stroke position, in which the output shaft is substantially wholly received within the casing or projects therefrom by a minimum length, and a second end-of-stroke position, or position of maximum projection of the output shaft from the casing.

Preferably, the magnetic rotors have an axial size larger than the axial size of the corresponding electromagnetic stators.

Advantageously, in this manner, the stators always at least partly face the respective rotors, independently of the axial position taken by the latter as a consequence of the translation imparted by the linear actuator.

More preferably, the magnetic rotors have an axial size exceeding the axial size of the corresponding electromagnetic stators by an amount at least equal to the translational displacement between the first and the second end-of-stroke position.

Advantageously, the axial size of the rotor exceeding the axial size of the corresponding stator at least by the extent of the translational displacement of the output shaft allows defining a plurality of equilibrium positions ensuring that, in case of failure, the rotor does not go off the stator because of the action of the force of gravity.

Actually, under such a condition, the rotor tends to become positioned in such a manner that an axial end of the magnets mounted thereon becomes aligned with an axial end of the stator pack, thus closing the electromagnetic field through the minimum reluctance path. Taking into account that the magnets and the stator pack have each two ends, four equilibrium positions as a maximum are defined depending on the stroke length allowed by the geometry of the assembly.

Preferably, the electromagnetic stators have mutually different axial sizes.

Preferably, the magnetic rotors have mutually different axial sizes.

More preferably, the magnetic rotor of the second, rotary actuator has a larger axial size than the magnetic rotor of the first, linear actuator.

Advantageously, such different axial sizes of the magnetic rotors ensure that the output shaft is kept inside the lower end portion of the electromagnetic stator of the rotary actuator, thereby ensuring that at least one equilibrium condition can be attained in which, in case of failure, the rotor does not wholly go off the casing.

Preferably, a first magnetic rotor associated with a first electromagnetic stator comprises a plurality of coaxially arranged annular permanent magnets, with alternating polarities along the axial extension of the output shaft, wherein the permanent magnets are radially polarised.

In the alternative, a magnetic rotor associated with a first electromagnetic stator comprises a plurality of annular permanent magnets coaxially arranged according to a Halbach array extending along the axial extension of the output shaft, the permanent magnets being axially polarised and being arranged with alternating polarities along the axial extension of the output shaft, by the interposition of annular elements suitable to promote the generation of a radial magnetic field.

Preferably, the annular elements suitable to promote the generation of a radial magnetic field are either rings of a ferromagnetic material or permanent magnets with a suitable radial polarisation.

Preferably, a second magnetic rotor associated with a second electromagnetic stator comprises a plurality of permanent magnets with elongated shape, arranged parallel to the actuation axis, with alternating polarities along the annular extension of the outer jacket surface of the output shaft, wherein the permanent magnets are axially polarised.

Preferably, the first electromagnetic stator of the coaxial and concentric electromagnetic actuators is located in a radially innermost position relative to the second electromagnetic stator of the electromagnetic actuators.

More preferably, the first electromagnetic stator located in a radially innermost position is the stator of the linear actuator.

In the alternative, the first electromagnetic stator of the coaxial and concentric electromagnetic actuators is located in a radially outermost position relative to the second electromagnetic stator of the electromagnetic actuators.

More preferably, the first electromagnetic stator located in a radially outermost position is the stator of the linear actuator.

Preferably, a central rod extends inside the casing coaxially with the output shaft and partly inside the same, the radially outermost electromagnetic stator being fastened to the outer casing and the radially innermost electromagnetic stator being fastened to the central rod.

More preferably, a portion of the output shaft located in an innermost position inside the casing is hollow and internally houses the central rod and the radially innermost electromagnetic stator fastened to the same rod.

Such a particular geometry of the output shaft allows obtaining the coaxial and concentric arrangement of the stators in a simple and compact manner.

Even more preferably, the radially innermost magnetic rotor associated with the radially innermost electromagnetic stator is mounted on the inner jacket surface of the hollow portion of the output shaft, and the radially outermost magnetic rotor associated with the radially outermost electromagnetic stator is mounted on the outer jacket surface of the hollow portion of the output shaft.

Preferably, the permanent magnets are made of a samarium—cobalt alloy and/or of a neodymium—iron—boron alloy and/or of an aluminium—nickel—cobalt alloy.

Preferably, at least the inner jacket surface and/or at least the outer jacket surface of the hollow portion of the output shaft is made of a ferromagnetic material.

In this manner, it is advantageously possible to make the jacket wall of the hollow portion of the output shaft with a limited thickness, while ensuring that no interference occurs between the lines of field generated by the magnets of the two different rotors.

In the alternative, at least the inner jacket surface and/or at least the outer jacket surface of the hollow portion of the output shaft is made of a non-ferromagnetic material.

According to such an alternative, the jacket wall of the hollow portion will be made with a sufficient thickness to avoid an interaction between the lines of field generated by the magnets of the two different rotors.

Preferably, the magnetic rotors are fastened (e.g. glued) to the outer jacket surface and the inner jacket surface, respectively, of the hollow portion of the output shaft.

Preferably, the output shaft is guided inside the casing by means of a guide element adapted to allow both rotation and translation.

Preferably, the guide element is a sliding contact bushing.

In the alternative, the guide element includes rolling means, such as a ball bushing mounted on ball bearings.

Preferably, both the output shaft and the central rod have an axial through cavity.

Advantageously, mechanical thrust means, if any, can be made to slide through the axial cavity.

Preferably, the free end of the hollow portion of the output shaft has a mark suitable to signal the relative and absolute position of the output shaft.

Preferably, the magnetic rotors are coated with a coating film.

More preferably, the coating film externally has a smooth surface suitable to facilitate the roto-translational movement of the output shaft inside the guide element.

More preferably, the position-signalling mark is formed on the coating film.

Further features and advantages of the present invention will become more apparent from the following detailed description of some preferred embodiments thereof, made with reference to the accompanying drawings.

The different features in the individual configurations can be combined together at will according the preceding description, should the advantages specifically resulting from a particular combination have to be exploited.

In the drawings.

In the following description, for explaining the Figures, the same reference numerals are used to denote constructive elements having the same functions. Moreover, for the sake of clarity of the illustration, it is possible that some reference numerals are not shown in all Figures.

Figure 1:
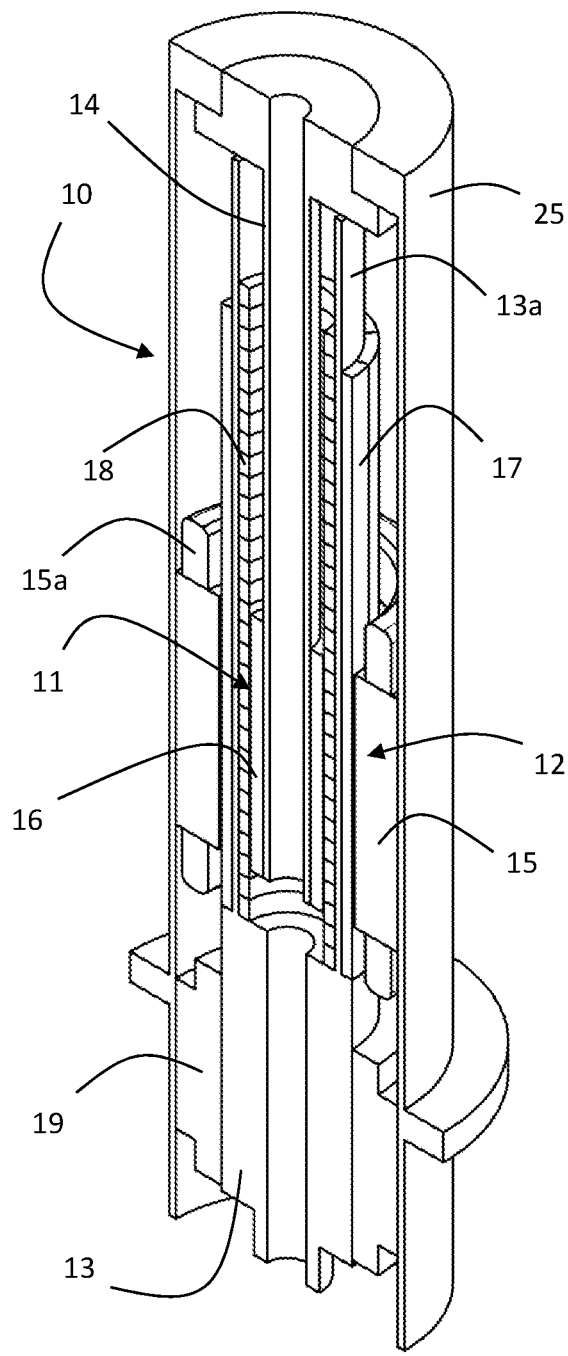
FIG. 1 is a sectional perspective view of a first preferred embodiment of the rotary-linear actuation assembly according to the present invention, in a first working configuration.
Figure 2:
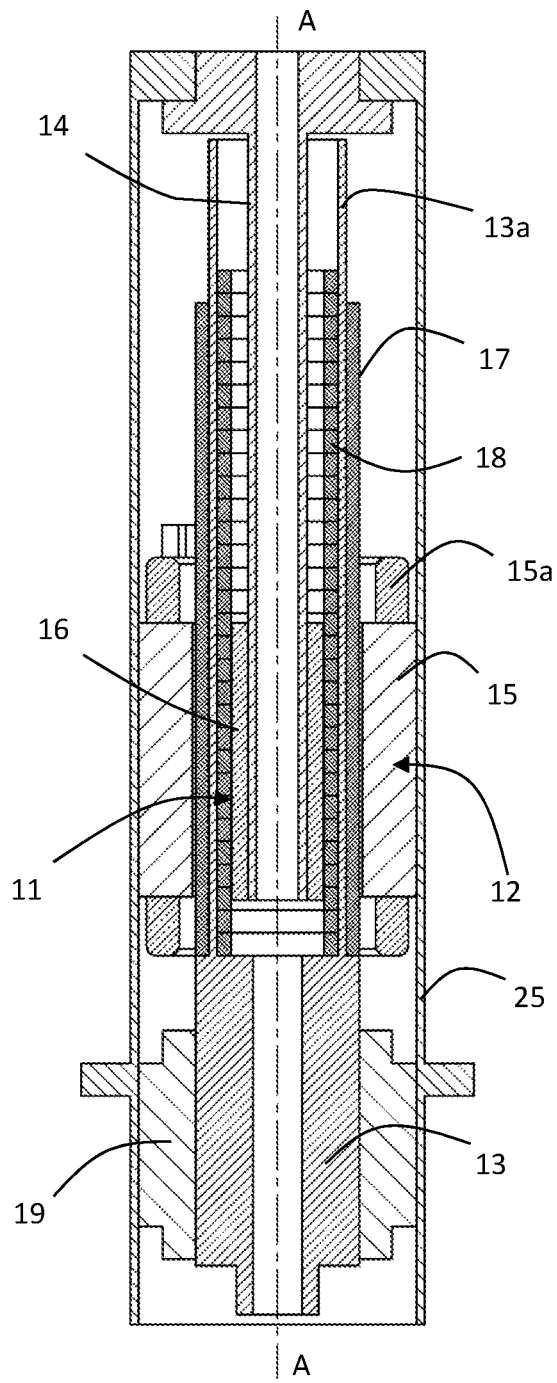
FIG. 2 is a sectional view of the rotary-linear actuation assembly shown in FIG. 1.
Figure 3:
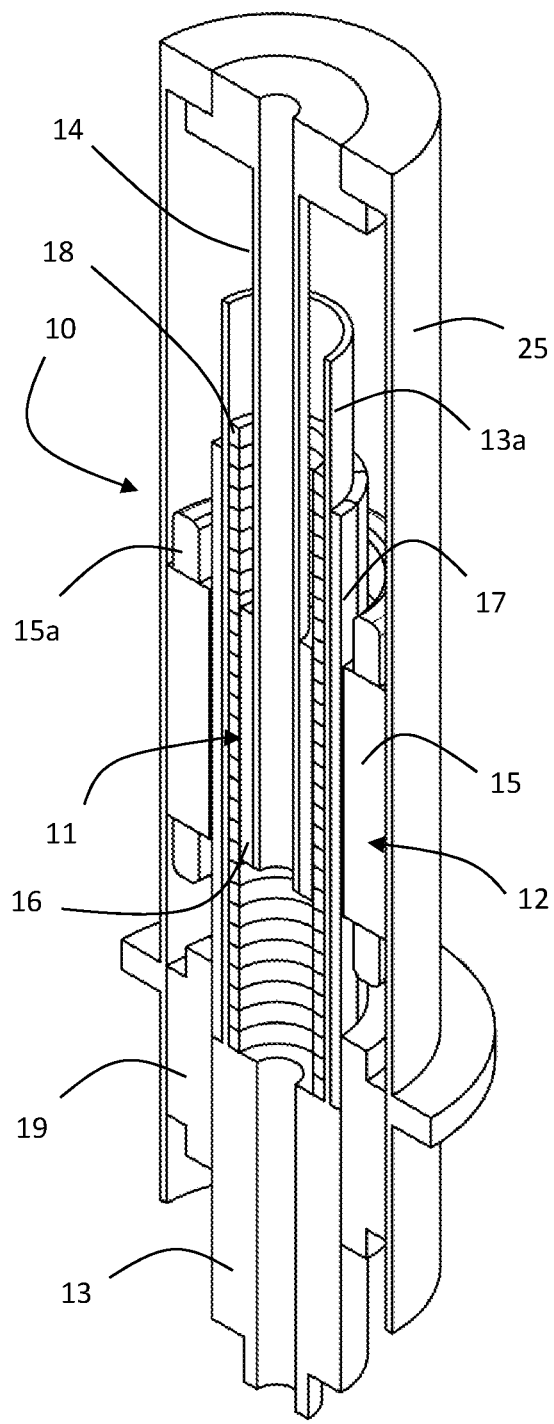
FIG. 3 is a sectional perspective view of the rotary-linear actuation assembly shown in FIG. 1, in a second working configuration.
Figure 4:
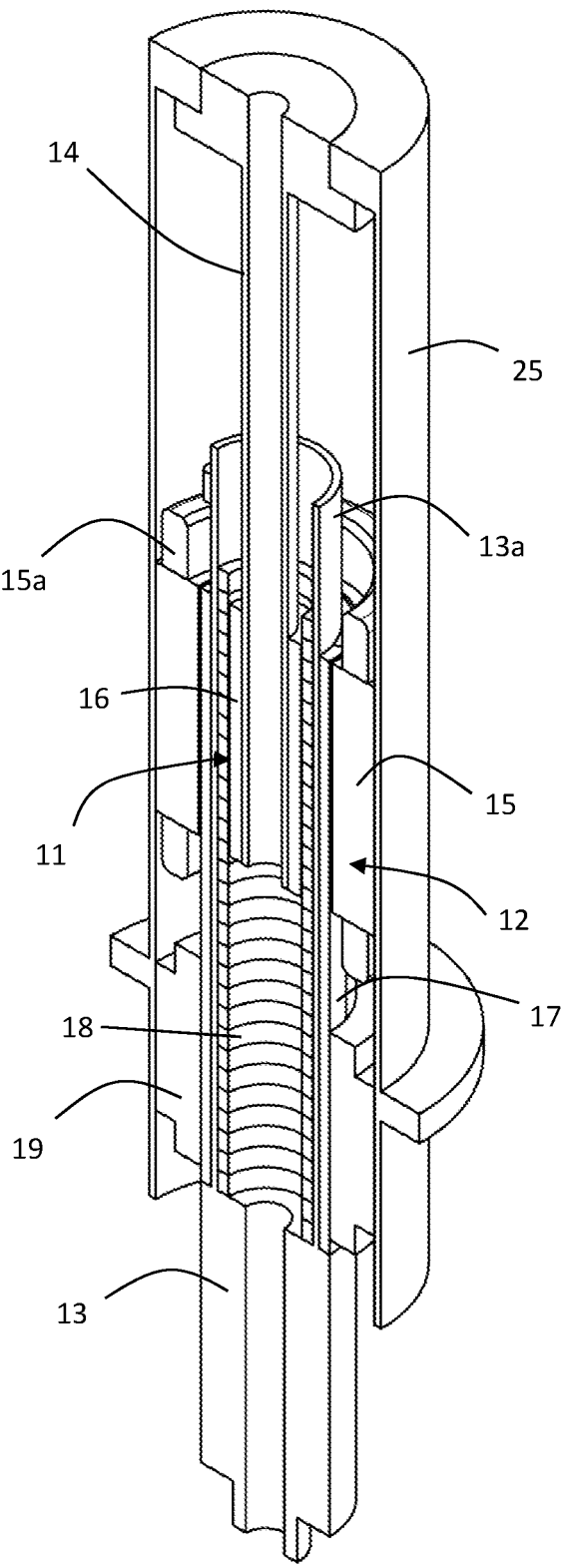
FIG. 4 is a sectional perspective view of the rotary-linear actuation assembly shown in FIG. 1, in a third working configuration.

Referring to FIGS. 1 to 4, there is shown a first preferred embodiment of a rotary-linear actuation assembly according to the present invention, generally indicated by reference numeral 10.

Rotary-linear actuation assembly 10 comprises a casing 25 inside which two actuators 11, 12 are housed, of which a first actuator, or linear actuator 11, is adapted to impart, at the output from actuation assembly 10, a translational movement along a main actuation axis A, and a second actuator, or rotary actuator 12, is adapted to impart, at its output, a rotary movement about actuation axis A.

Each actuator 11, 12 is an electromagnetic actuator and both of them act on a same output shaft 13 coaxial with actuation axis A. More particularly, the first actuator 11 is adapted to impart a translational displacement between a first end-of-stroke position, in which output shaft 13 is substantially wholly received within casing 25 or projects therefrom by a minimum length, and a second end-of-stroke position, or position of maximum projection of output shaft 13 from casing 25.

Each actuator 11, 12 includes a respective electromagnetic stator 15, 16 cooperating with a corresponding magnetic rotor 17, 18, wherein both magnetic rotors 17, 18 are constrained to displace with output shaft 13.

According to the present invention, electromagnetic stators 15, 16 are arranged in a mutually coaxial and concentric manner.

More particularly, in the embodiment illustrated, stator 15 of the second actuator 12 adapted to impart a rotary movement is located in an outermost position, and stator 16 of the first actuator 11 adapted to impart a translational displacement is located in an innermost position.

More specifically, electromagnetic stator 15 of the second actuator 12 is fastened to external casing 25, whereas electromagnetic stator 16 of the first actuator 11 is fastened to a central rod 14 extending coaxially with output shaft 13 and partly inside the same shaft 13.

Electromagnetic stator 16 of the first actuator 11 includes a plurality of coils (not shown) of which the winding axis is coaxial with actuation axis A, whereas electromagnetic stator 15 of the second actuator 12 includes a plurality of coils 15a of which the winding axis is radial relative to actuation axis A.

A portion 13a of output shaft 13 located in an innermost position in casing 25 is hollow and internally houses central rod 14 and electromagnetic stator 16 of the first actuator 11, fastened to the same rod 14.

Both magnetic rotor 18 associated with electromagnetic stator 16 of the first actuator 11 and magnetic rotor 17 associated with electromagnetic stator 15 of the second actuator 12 are mounted on hollow portion 13a of the output shaft.

More particularly, magnetic rotor 18 associated with electromagnetic stator 16 of the first actuator 11 is glued to the inner jacket surface of hollow portion 13a of output shaft 13, whereas magnetic rotor 17 associated with electromagnetic stator 15 of the second actuator 12 is glued to the outer jacket surface of hollow portion 13a of output shaft 13. In this way, magnetic rotors 17, 18 are stationary as far as relative displacements are concerned, thus substantially forming an integral piece with hollow portion 13a of output shaft 13.

Magnetic rotor 18 of the first actuator 11 includes a plurality of coaxially arranged and radially polarised annular permanent magnets. More particularly, the annular permanent magnets are arranged with alternating polarities along the axial extension of output shaft 13. Magnetic rotor 18 of the first actuator 11 thus generates an axial flux, i.e. a flux parallel to actuation axis A, inside hollow portion 13a of output shaft 13.

Magnetic rotor 17 of the second actuator 12 includes a plurality of permanent magnets with elongated shape, e.g. a roof tile or a parallelepiped shape, arranged parallel to actuation axis A, with alternating polarities along the annular extension of the outer jacket surface of output shaft 13. The permanent magnets of magnetic rotor 17 of the second actuator 12 are axially polarised, thus generating a radial flux, i.e. a flux transverse to actuation axis A, outside hollow portion 13a of output shaft 13.

Hollow portion 13a of output shaft 13 is made of a ferromagnetic material, thus preventing the lines of flux of the permanent magnets belonging to different rotors 17, 18 from mutually interfering.

Both magnetic rotor 18 of the first actuator 11 and magnetic rotor 17 of the second actuator 12 have an axial size larger than the axial size of the corresponding electromagnetic stator 15, 16, in order stators 15, 16 always at least partly face the respective rotors 17, 18, independently of the axial or angular positions taken by the latter as a consequence of the translation imposed by the first actuator 11 and the rotation imposed by the second actuator 12.

In the first embodiment illustrated, output shaft 13 is guided inside an element 19 adapted to allow both rotation and translation, e. g. a sliding contact bushing.

Even if this is not shown, rotors 17, 18 are coated with a coating film intended to contain and protect the magnets and, besides, to allow having smooth and treated surfaces in order to facilitate the roto-translational movement of shaft 13 inside bushing 19.

At the free end of hollow portion 13a of output shaft 13, the coating film preferably includes a mark (not shown) suitable to signal the relative and absolute position of output shaft 13 through suitable optical surveys.

In the first embodiment illustrated, both output shaft 13 and central rod 14 are hollow, in order to possibly allow mechanical thrust means, if any, to slide inside them.

Figures 5, 5A:
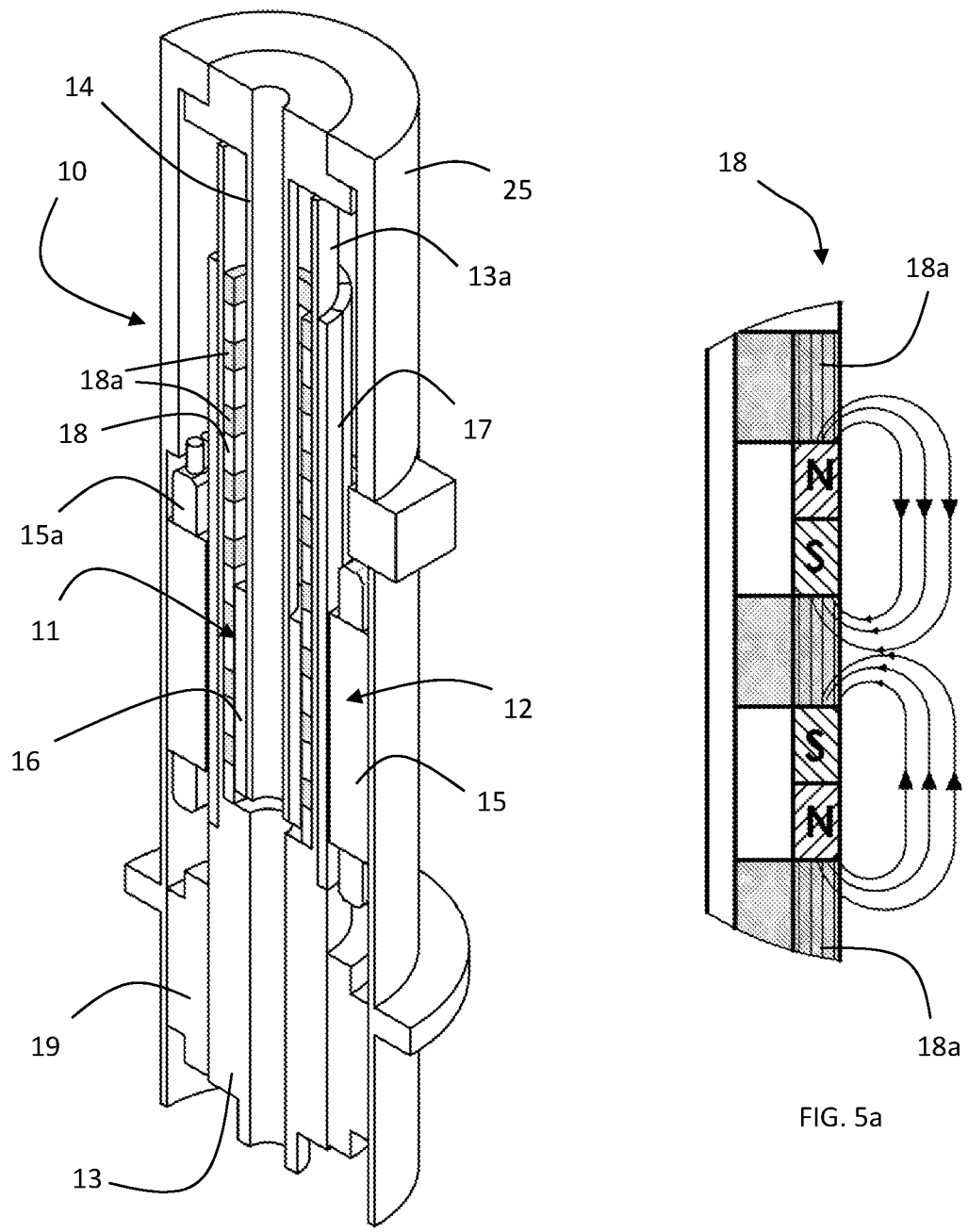
FIG. 5 is a sectional perspective view of a second preferred embodiment of the rotary-linear actuation assembly according to the present invention, in a first working configuration.
FIG. 5a is an enlarged detail of the rotary-linear actuation assembly shown in FIG. 5, schematically showing the lines of the magnetic field generated.

Referring to FIG. 5, there is shown a second embodiment of rotary-linear actuation assembly 10 according to the invention, which differs from the first embodiment only in respect of the configuration of magnetic rotor 18 of the first actuator 11.

In the embodiment shown in FIG. 5, magnetic rotor 18 of the first actuator 11 comprises a plurality of annular permanent magnets arranged according to a Halbach array. More specifically, as shown in more detail in FIG. 5a, the permanent magnets are axially polarised and are coaxially arranged with alternating polarities along the axial extension of output shaft 13, by the interposition of annular elements 18a suitable to promote the generation of a radial magnetic field.

Specifically, in the embodiment shown in FIG. 5, the annular elements suitable to promote the generation of a radial magnetic field are rings of a ferromagnetic material.

The axial field generated by the annular permanent magnets tends to be repelled due to the arrangement of the magnets with alternating polarities, thereby radially exiting from ferromagnetic annular elements 18a. In this manner, also magnetic rotor 18 of the first actuator 11 according to the embodiment shown in FIG. 5 generates an axial flux, i.e. a flux parallel to actuation axis A, inside hollow portion 13a of output shaft 13.

Moreover, in the embodiment shown in FIG. 5, magnetic rotor 18 of the first actuator 11 has a shorter axial size than magnetic rotor 17 of the second actuator 12.

The operation of rotary-linear actuation assembly 10 according to the invention is as follows.

When linear actuator 11 is actuated, stator 16 consisting of the plurality of axial coils generates magnetic forces causing the translation of magnetic rotor 18 consisting of the plurality of annular permanent magnets, similarly to the case of a tubular linear motor.

When rotary actuator 12 is actuated, stator 15 consisting of the plurality of radial coils generates magnetic forces causing the rotation of magnetic rotor 17 consisting of the plurality of elongated permanent magnets arranged side by side so as to form a ring, similarly to the case of a brushless rotary motor.

The two actuators can be independently actuated, simultaneously or sequentially, whereby they can thus generate any rotary-linear movement. More specifically, the controls and the adjustment systems controlling the individual actuators can be constructed in a wholly mutually independent manner.

More particularly, the axial size of magnetic rotor 17, larger than the axial size of the corresponding electromagnetic stator 15, is chosen so that at least a portion of rotor 17 always faces stator 15, independently of the axial position linear actuator 11 imposes on output shaft 13.

At any rate, electromagnetic stator 16 of the first actuator 11 is preferably arranged so that, when output shaft 13 is in the position of maximum projection from casing 25, such a stator 16 wholly faces the magnetic rings forming the corresponding magnetic rotor 18, thereby obtaining the condition of maximum applicable force also in that position.

In the alternative, electromagnetic stator 16 of the first actuator 11 can be arranged so as to push output shaft 13 beyond the condition of maximum overlap between electromagnetic stator 16 and the corresponding magnetic rotor 18, whereby it can attain the condition in which the last pair of magnetic rings forming magnetic rotor 18 faces the last coils forming electromagnetic stator 16, with a progressively decreasing axially applicable force.

The features of the rotary-linear actuation assembly according to the present invention are clearly apparent from the above description, as are clearly apparent the relevant advantages.

The rotary-linear actuation assembly according to the invention is particularly suitable for use in moving robotic arms, e.g. arms employed in component assembly lines, along and about an actuation axis.

Thanks to the movement independence offered by the rotary-linear actuation assembly according to the invention, the assembly is perfectly capable of performing any combination and/or sequence of rotational and translational movements depending on the particular operation to be carried out.

Moreover, the compact size and the limited inertial actions characterising the rotary-linear actuation assembly according to the invention allow providing robotic arms with optimised geometry and consumptions.

Further variants of the embodiments described above are possible without departing from the teaching of the invention.

Lastly, it is clear that a rotary-linear actuation assembly as conceived can undergo several changes and modifications, all included in the invention. Moreover, all details can be replaced by technically equivalent elements. In practice, any material as well as any size can be used, depending on the technical requirements.

The invention claimed is:

1. A rotary-linear actuation assembly (10) comprising a casing (25) internally housing:
    an output shaft (13) arranged coaxial with an actuation axis (A) in a translationally and rotationally movable manner; and
    at least two electromagnetic actuators (11, 12) each comprising a respective electromagnetic stator (16, 15) and a respective magnetic rotor (18, 17), a first of which is a linear actuator (11) adapted to impart, at its output, a translational movement along the actuation axis (A), and a second of which is a rotary actuator (12) adapted to impart, at its output, a rotary movement around the actuation axis (A),
    wherein the electromagnetic stators (15, 16) of the electromagnetic actuators (11, 12) are arranged in a mutually coaxial and concentric manner, and each actuator (11, 12) independently acts on the output shaft (13), and
    wherein inside the casing (25), a central rod (14) extends coaxially with the output shaft (13) and partly inside the output shaft (13), a radially outermost electromagnetic stator (15, 16) out of the first (16) and the second (15) electromagnetic stator being integrally constrained inside the casing (25) and one radially innermost electromagnetic stator (16, 15) out of the first (16) and the second (15) electromagnetic stator being integrally constrained to the central rod (14).

2. The rotary-linear actuation assembly (10) according to claim 1, wherein the magnetic rotors (17, 18) have a larger axial size with respect to the axial size of the corresponding electromagnetic stators (15, 16) by an amount at least equal to a maximum translational movement imparted by the first linear actuator (11) along the actuation axis (A) between a first and a second stroke end position.

3. The rotary-linear actuation assembly (10) according to claim 1, wherein a first magnetic rotor (18) of the respective magnetic rotors associated with a first electromagnetic stator (16) of the respective electromagnetic stators comprises a plurality of coaxially arranged annular permanent magnets, with alternating polarities along an axial extension of the output shaft (13).

4. The rotary-linear actuation assembly (10) according to claim 3, wherein the annular permanent magnets are coaxially arranged, with alternating polarities along the axial extension of the output shaft (13), by the interposition of annular elements (18a) suitable to promote the generation of a radial magnetic field.

5. The rotary-linear actuation assembly (10) according to claim 1, wherein a second magnetic rotor (17) of the respective magnetic rotors associated with a second electromagnetic stator (15) of the respective electromagnetic stators comprises a plurality of permanent magnets with elongated shape, arranged parallel to the actuation axis (A), with alternating polarities along an axial extension of an outer jacket surface of the output shaft (13).

6. The rotary-linear actuation assembly (10) according to claim 1, wherein an innermost portion (13a) of the output shaft (13) inside the casing (25) is hollow and houses at its interior the central rod (14) and the radially innermost electromagnetic stator (16, 15) constrained to the same rod (14).

7. The rotary-linear actuation assembly (10) according to claim 6, wherein a radially innermost magnetic rotor (18, 17) out of the first (18) and the second (17) magnetic rotor, associated with the radially innermost electromagnetic stator (16, 15), is mounted on an inner jacket surface of the hollow portion (13a) of the output shaft (13), and a radially outermost magnetic rotor (17, 18) out of the first (18) and the second (17) magnetic rotor, associated with the radially outermost electromagnetic stator (15, 16), is mounted on an outer jacket surface of the hollow portion (13*a*) of the output shaft (13).

8. The rotary-linear actuation assembly (10) according to claim 7, wherein at least the inner jacket surface and/or at least the outer jacket surface of the hollow portion (13*a*) of the output shaft (13) is made of a ferromagnetic material.

9. The rotary-linear actuation assembly (10) according to claim 6, wherein at least an inner jacket surface and/or at least an outer jacket surface of the hollow portion (13*a*) of the output shaft (13) is made of a ferromagnetic material.

10. The rotary-linear actuation assembly (10) according to claim 1, wherein the output shaft (13) is guided inside the casing (25) by means of a guide element (19) adapted to allow both rotation and translation.

11. The rotary-linear actuation assembly (10) according to claim 1, wherein the electromagnetic stators (15, 16) have mutually different axial sizes.

12. The rotary-linear actuation assembly (10) according to claim 1, wherein the magnetic rotors (17, 18) have mutually different axial sizes.

13. The rotary-linear actuation assembly (10) according to claim 1, wherein the magnetic rotor of the second, rotary actuator has a larger axial size than the magnetic rotor of the first, linear actuator.

\* \* \* \* \*